Jan. 27, 1953 R. F. McGRAW ET AL 2,626,858

CARBRO PROCESS

Filed Dec. 11, 1945 2 SHEETS—SHEET 1

Inventors
Richard F. McGraw
Lawrence Plotin
Werner E. Alexewicz
Bakelew & Castlebury
Attys.

Inventors
Richard F. McGraw
Lawrence Plotin
Werner G. Alexewicz
Bakewell & Churchbury
Attys.

Patented Jan. 27, 1953

2,626,858

UNITED STATES PATENT OFFICE 2,626,858

CARBRO PROCESS

Richard F. McGraw, Sierra Madre, Lawrence Plotin, North Hollywood, and Werner G. Alexewicz, Burbank, Calif., assignors, by mesne assignments, to Richard F. McGraw, doing business as McGraw Colorgraph Company, Burbank, Calif.

Application December 11, 1945, Serial No. 634,278

1 Claim. (Cl. 41—41)

The carbro process of printing color photographs, as ordinarily carried out, may be outlined as follows. It is assumed that a suitable set of color separation negatives is available, each representing the subject as seen by light of a particular wave length region, the (say) three regions together making up essentially the whole of the visible spectrum.

First, a positive bromide print is made, ordinarily by projection, from each of the three color separation negatives.

Second, so-called carbon tissues of appropriate colors are provided, consisting of pigmented unhardened gelatin coated on a paper backing. Each tissue is sensitized by soaking in a suitable well-known aqueous solution, and the outer surface of the pigmented gelatin layer is brought into contact with the bromide emulsion, and intimate contact is established by pressure. Chemical action forms a latent image of hardened pigmented gelatin extending inward from the surface of the pigmented gelatin.

Third, each pigmented tissue is separated from its bromide and is then wet and squeegeed face down upon a separate sheet of transparent plastic or waxed Celluloid.

Fourth, each image is "developed" in hot water, which first melts the soft gelatin, releasing the paper backing, and then dissolves all the remaining soft gelatin, leaving the colored image of hardened pigmented gelatin adhering to the surface of the clear plastic.

Fifth, after drying, the three developed color images are assembled in superposition by successive transfer from the three transparent supports on which they were "developed" to a temporary support, consisting of a piece of paper coated with soft gelatin. On each transfer operation this paper and the plastic sheet bearing the image to be transferred are soaked in cold water, squeegeed into intimate contact face-to-face, and allowed to dry. As the paper dries the colored image clings to the soft gelatin and is pulled away from the plastic. During the transfer of the second and third images to the temporary support, correct registration is obtained by manipulation of the paper of the temporary support, while observing the images through the transparent plastic.

Sixth, the assembled color images are transferred as a unit from the temporary support to whatever final support is to be used.

Since the repeated wetting and drying of the temporary support inevitably changes its dimensions, and since both the paper bromide prints and the pigmented carbon tissues are also subject to dimensional changes during processing, the usual process of obtaining registration during the fifth step requires not only correct relative location and orientation of the plastic sheet and the temporary support to bring the images together at one point, say at their center, but also requires the differential stretching of the paper in various directions by an amount which generally varies from place to place over the picture. This must be accomplished progressively at the same time that the adhesion between paper and plastic is gradually increased. This is inevitably a slow process, requiring unusual ability and training, and is responsible for a large fraction of the expense of producing carbro prints.

In addition to the difficulty of obtaining accurate registration, a generally recognized shortcoming of the carbro color process as ordinarily carried out is the tendency of the high lights to become veiled over or fogged, so that the lightest parts of the images contain more pigment than would correspond to the silver deposit of the respective bromides.

Two primary objects of the present invention are to avoid the difficulty and expense of manual registration during assembly of the separate color images, and to obtain high lights which are free from fog. Other objects and purposes of the invention will appear.

The chief characteristics of our new carbro process will be evident from the following brief description of the steps which are involved in a preferred embodiment of our invention.

First, the layers of pigmented unhardened gelatin are transferred from the special paper supports on which they have been originally coated to dimensionally stable supports, preferably sheets of plastic, which are provided with some mechanical means of registration, such as pins or punched holes. This operation results in turning over each gelatin layer, exposing that side which was previously protected by the paper support. Bromide emulsions are likewise provided on dimensionally stable supports equipped with means of registration. These emulsions may be coated originally on a suitable support, such as orinary film base of a suitable type, which can then, for example, be punched with registration apertures; or, preferably, the emulsions may be supplied originally on a stripping paper support and transferred before exposure to plastic sheets or other stable supports already provided with means of registration.

Second, the several color separation negatives are printed photographically by contact or projection onto the plastic supported bromides, the positions of the images relative to the registration elements being determined mechanically. These prints are processed and dried normally.

Third, the plastic supported pigmented gelatins are sensitized and their then external faces rolled into contact with the respective wet plastic supported bromide prints in essentially the usual way, except that as such contact is made, the relative position of the two "contacting" supports is determined mechanically. After the normal reaction time the pairs of plastics are separated.

Fourth, the plastic supported pigmented gelatin of one color (which will finally form the surface layer of the completed print) is rewet and brought into contact with the surface of a dimensionally stable assembly support, preferably a plastic sheet, which is equipped with suitable registration means by which the relative position of the two supports is determined mechanically. The image (which is now on the gelatin face next to the assembly support) is now developed as usual with hot water, releasing the contacting support, and leaving the developed image on the surface of the assembly support, where it is then dried.

Fifth, the second latent pigmented gelatin image (which will finally form the central layer in the completed print) is wet and brought into contact with the already developed first image on the assembly plastic, which has been dried and rewet. The relative position of the plastics is determined mechanically in such a way that the two images are correctly registered. The second image is then developed by the usual technique. The two superposed images on the assembly support are then dried.

Sixth, the third latent image is superposed in register upon the first two in the same way that the second was superposed on the first, registration being accomplished mechanically. The third image is developed in the usual way, and the three superposed images are dried.

Seventh, the complete color image is transferred as a unit from the assembly support to the final support.

Further details of our new carbro process are illustrated in the accompanying drawings, in which the thickness of the various elements is exaggerated for the sake of clarity:

Figs. 1 and 2 are perpspectives illustrating a preferred form of mechanical means of registration for the color separation negatives in the negative holder, Fig. 1 showing a negative equipped with slots, and Fig. 2 showing the negative holder provided with registering pins.

Figs. 1*a* and 2*a* are perspectives illustrating a preferred form of mechanical means of registration for the plastic sheets, Fig. 1*a* showing one sheet equipped with slots, and Fig. 2*a* showing the other sheet of a registering pair provided with registering pins.

Figure 8:
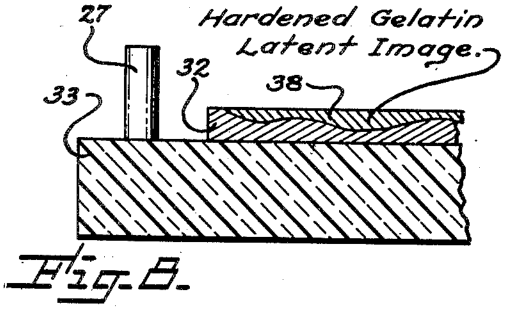
Figure 12:
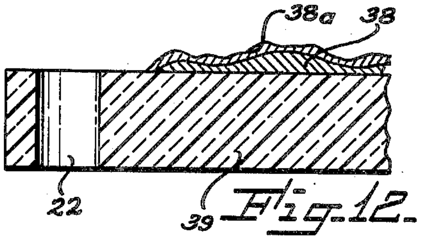
Figure 9:
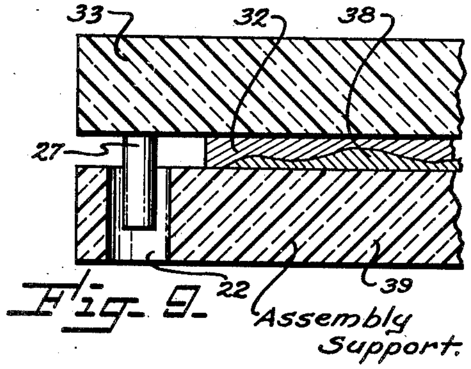
Figure 13:
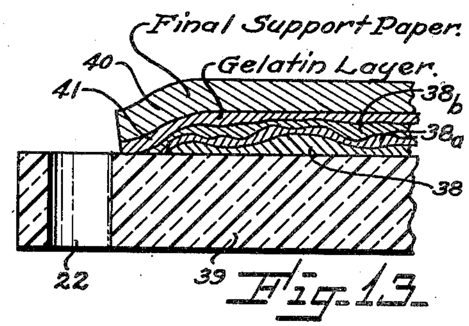
Figure 10:
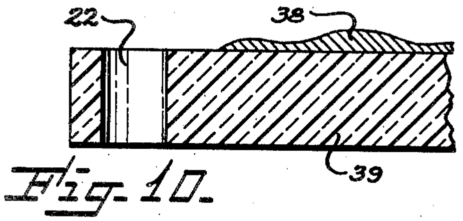
Figure 14:
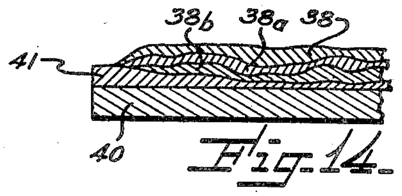
Figure 11:
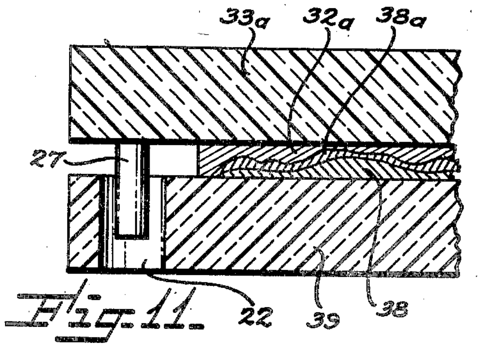

Fig. 8 indicates by a schematic partial section the position of the hardened latent image in a soft gelatin layer after chemical reaction with the bromide;

Fig. 9 illustrates the step of contacting the first latent image to an assembly support for development;

Fig. 10 is a schematic partial section of the first developed image upon the assembly support;

Fig. 11 illustrates the step of contacting the second latent image for development in registered superposition upon the developed first image on the assembly support;

Fig. 12 is a schematic partial section of the first and second developed images upon the assembly support;

Fig. 13 illustrates the step of transferring the complete color image from the assembly support to the final support; and Fig. 14 illustrates in partial section the completed color print.

Figure 1:
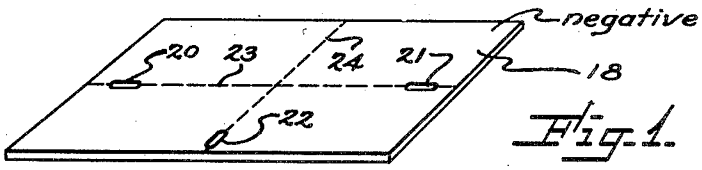
Figure 2:
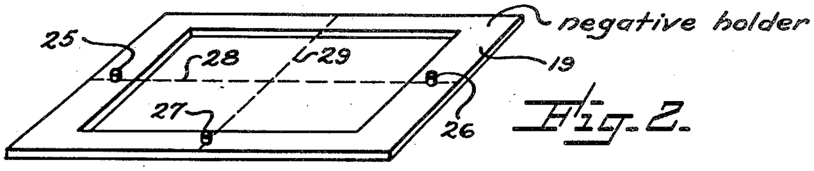
Figure 1A:
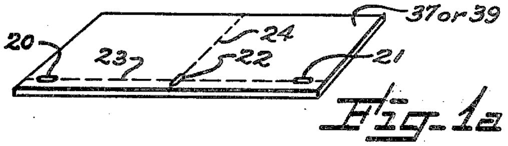
Figure 2A:
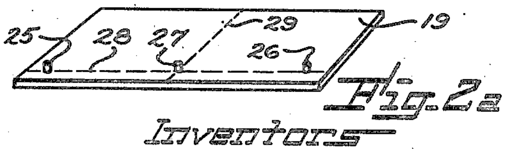

The sections in Figs. 4 and 6–13 are taken along the line 24 of Fig. 1*a* or the line 29 of Fig. 2*a*.

Any suitable registration means may be used in our process to determine the position of an image on a support. Although we prefer to do this mechanically, it would be possible to use visual registration marks in the marginal areas of the various images. Visual registration by means of such marks in our new process would be a very simple operation by comparison with the type of visual registration necessary in the ordinary carbro process. Since in our process the images are at all times mounted on dimensionally stable supports, no significant relative changes of dimension among the separate images can occur. Therefore, registration in our process requires only the correct relative location of the two supports, and does not involve the local or overall stretching or compression of one support relative to the other.

Two examples will be given of the sort of mechanical registration means which can be used in our process. Figs. 1 and 2 illustrate preferred means for holding the color separation negatives 18 in registered position in the printing frame or negative holder 19 during photographic exposure of the bromide emulsion (step 2 of our process as outlined above). This method of registration is described also in Patent No. 2,399,975, issued to Joseph Arthur Ball for Registration Process and Apparatus. Each of the negatives to be registered carries apertures 20, 21 and 22 punched in the marginal area as in Fig. 1, and so arranged that they fit over pins 25, 26 and 27, respectively, in the negative holder, Fig. 2. The two apertures 20 and 21 have parallel sides which fit closely over the pins 25 and 26, and are so oriented that when one of the negatives is placed in the frame the line 23 joining the apertures 20 and 21 is restrained to lie in superposition upon the line 28 joining the pins 25 and 26. The relative position of the negative and frame along these lines is determined by the pin 27 in the frame which fits between the parallel sides of the slot 22 in the negative. The sides of this slot are parallel to the line 24 which makes an angle of essentially ninety degrees with the line 23, and intersects it near the center of the picture area.

An advantage of this particular registration device is that the central region of the image is brought into correct registration regardless of slight overall expansion or contraction of the negative. Imperfect registration caused by such expansion or contraction is limited to the outer parts of the picture and does not exceed approximately half what would result under similar circumferences if the registration apertures were restricted in the usual way to the marginal area along only one side of the picture.

Figs. 1*a* and 2*a* illustrate a second example of preferred registration means, which we use for registering all the emulsion bearing supports except the negatives. The three apertures 20, 21 and 22 of one sheet of a registering pair, Fig. 1*a*, and the three mating pins 25, 26 and 27 of the second sheet, Fig. 2*a*, are numbered to correspond with the apertures and pins of Figs. 1 and 2, and they function similarly in establishing registration. However, all registration elements are now located along one margin of the picture. As will be seen at once from Figs. 1*a* and 2*a*, the region of the picture which is accurately registered regardless of slight differential shrinkage or expansion of the two sheets is near the center of this margin, at the intersection of the line 23 joining the apertures 20 and 21 (and parallel to their sides) and the line 24, parallel to the sides of the aperture 22. Thus registration of the central picture area is still independent of small dimensional changes parallel to the line 23 but not at right angles to it. Concentration of the registration elements in one margin permits the two sheets to be registered by bringing them together along this margin only. They can then be rolled rapidly into close contact over the remainder of their area, by rolling from the registered margin toward the opposite margin.

In the following discussion of the various steps of a preferred procedure under our invention we shall assume for definiteness that mechanical means of registration similar to those just described are employed, although any other suitable registration means may be used.

Figures 3, 4, 5, 6, 7:
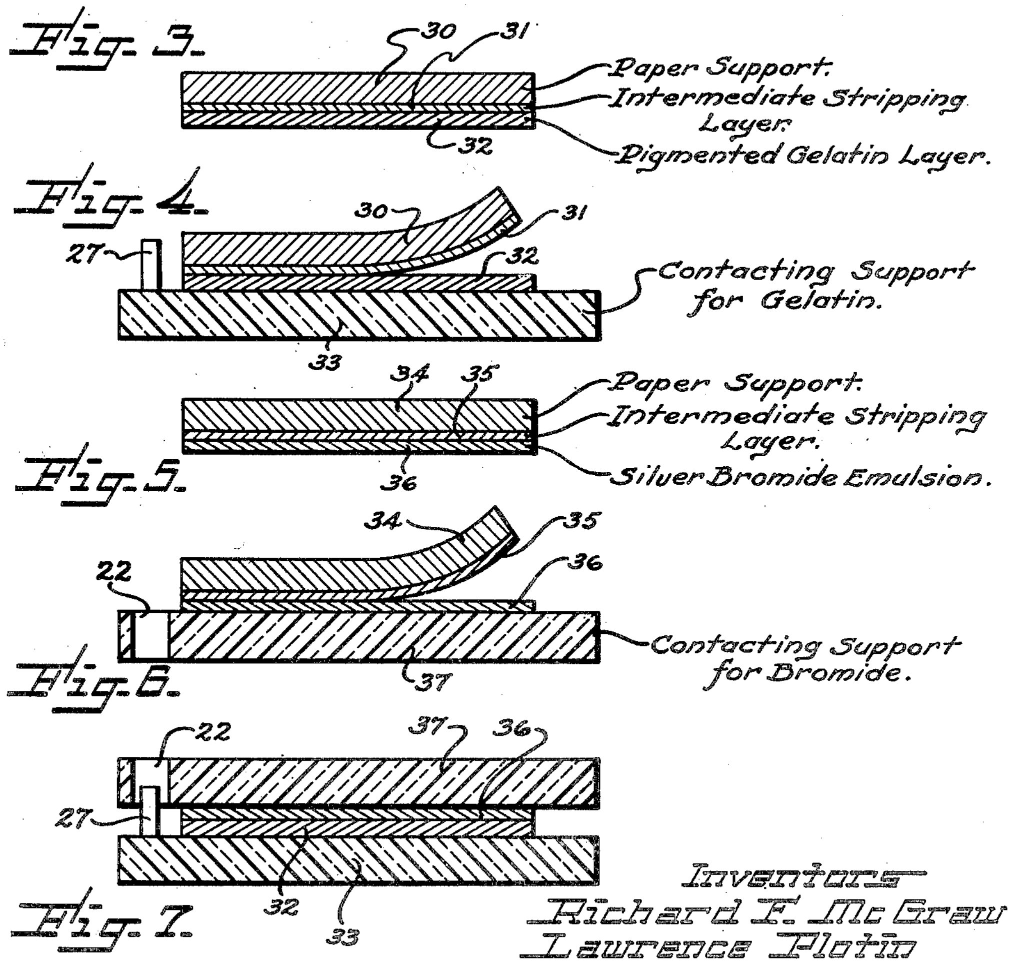
Fig. 3 represents schematically a section through the special pigmented tissue used in our process.
Fig. 4 is a schematic section illustrating the process of transferring the pigmented gelatin layer from the special paper support to a dimensionally stable contacting support.
Fig. 5 represents schematically a section through the special bromide paper which may be used in our process.
Fig. 6 illustrates in section the process of transferring the bromide emulsion from the special paper support to a dimensionally stable contacting support.
Fig. 7 illustrates in section the step of contacting the pigmented gelatin layer to the bromide emulsion.

The first step of our process, in the preferred form outlined briefly above, is the transfer of both the bromide emulsions and the layers of pigmented gelatin to dimensionally stable supports. According to the present invention, a new kind of pigmented carbon tissue is used, in which the gelatin layer is not coated directly on the paper support, but on top of a previously coated intermediate layer which makes it possible to transfer the gelatin to a dimensionally stable support, exposing that surface of the gelatin which was originally protected by the support. Fig. 3 represents schematically the stripping tissue, showing the paper support at 30, the intermediate stripping layer at 31, and the pigmented gelatin layer at 32.

Among the requirements for a suitable stripping layer are the following: the bond between the stripping layer and the overlying gelatin emulsion must be sufficiently strong to survive normal storage and handling when dry; after having been wet briefly in water (or in a weak solution of hydrochloric acid) the gelatin must still be held firmly enough for convenient manipulation; and when the wet gelatin surface has been forced into close contact with the support to which it is to be transferred, the paper backing with its stripping layer must strip off readily without requiring the application of any liquid which is a solvent for the material of the stripping layer. By eliminating the use of a solvent for the stripping layer all possibility is avoided that the solvent or the dissolved material of the stripping layer might contaminate the pigmented gelatin and affect the intricate interaction between the bromide print and the various ingredients of the sensitizing solution in the gelatin.

We have found that a stripping layer with the desirable properties described above can be made in the following way. The paper support is coated with a 4 to 8% solution of vinyl acetate resin, a polymerization product of vinyl acetate (such as type AYAT supplied commercially by Carbide and Carbon Chemicals Corp.) in a suitable volatile solvent, which may be, for example, a mixture of approximately 75% isopropyl alcohol, 5% acetone and 20% water. After this layer has dried the gelatin is coated on top of it in the usual way. In applying the stripping layer it is important to control its thickness closely. This is done by properly regulating the rate of coating and the viscosity of the solution, which in turn depends primarily upon the concentration of resin in the solution and upon the temperature. The proper thickness is such that after the stripping layer has dried the surface of the paper is just covered essentially completely. If paper fibers protrude beyond the stripping layer to any appreciable extent, they will so increase the bond with the gelatin layer as to prevent easy stripping. If, one the other hand, the stripping layer is made thicker than is necessary to cover the paper, it is likely to have too smooth a surface, so that the bond with the gelatin will be relatively weak and may be broken during storage or handling. If paper of the type of photographic raw paper is used, coating conditions which lead to a deposit of approximately 1.5 to 1.8 grams of resin per sq. ft. of paper have been found to give a suitable stripping layer. Stripping tissue of the type preferred for use in the present process is further described and claimed in our copending patent application, Serial No. 39,116, filed on July 16, 1948, now U. S Patent No. 2,606,130, issued August 5, 1952, as a division of the present application.

The "dimensionally stable" supports used throughout our process should be made of some material which does not change dimension appreciably with alternate wetting and drying or when subjected to small temperature changes. In addition, some or all of these supports must be flexible enough so that they can be rolled into contact with each other in much the same way that the usual paper supported emulsions are normally handled. It is possible in our process to use non-flexible material for the gelatin contacting supports provided flexible material is used for both the bromide contacting supports and the assembly support; or, if flexible material is used for the gelatin contacting supports, it is possible to use non-flexible material for the bromide contacting supports and for the assembly support. We prefer to use flexble material throughout, but of a type that gives appreciably more stability than would be obtained, for example, with the type of base on which photographic film is normally coated. A material which we have found very suitable for all three kinds of support mentioned above is the plastic known by the trade name of "Vinylite Rigid Sheets," in a thickness of 0.03'' to 0.05''. To make the emulsions adhere more firmly, the surface of the Vinylite used for the supports of both the pigment layer and the bromide layer is "grained" by grinding lightly with an abrasive. For registration we provide the bromide contacting support and the assembly support with apertures as indicated in Fig. 1*a*, and the pigmented gelatin contacting supports with corresponding pins as indicated in Fig. 2*a*.

By using a stripping layer like that described above, the transfer of the gelatin layer to a dimensionally stable support can be carried out very simply. The special gelatin tissue is first soaked in water, or, preferably, in a weak solution of approximately ½% hydrochloric acid in water, to swell the gelatin layer and make it tacky. The exposed gelatin surface is then rolled into intimate contact with the grained surface of the support to which it is to be transferred, shown at 33 in Fig. 4. Alhough this support is provided with suitable registration means, indicated by the pin 27, no attention need be given to registration during this transfer. After standing for several minutes, the paper backing 30, bearing the intermediate layer 31, is separated from the gelatin 32 at one corner and stripped off, as indicated in Fig. 4. The plastic supported gelatin layer is then dried.

The use of acid in the soaking bath has been found to be the more desirable the older is the gelatin layer to be transferred. This is because a skin of relatively hard gelatin gradually forms upon the exposed surface of the gelatin. When soaked in plain water this hard surface may not swell sufficiently to give firm adherence to the new support. By the use of hydrochloric acid in concentrations up to about ½% essentially the same degree of tackiness can be produced in the hardened surface layer as when soft gelatin is soaked in plain water. Concentrations of hydrochloric acid much in excess of ½% swell the gelatin too much, so that it loses tackiness and becomes difficult to handle. (Other effects of the surface layer of hardened gelatin are discussed below.)

The stripping support upon which the bromide emulsion is coated is preferably of the same type as that described above for the pigmented gelatin. The bromide emulsion is indicated at 36 in Fig. 5, the stripping layer at 35 and the paper support at 34. Fig. 6 shows the actual transfer of the bromide emulsion 36 to its dimensionally stable support 37, registration means being indicated by the aperture 22. The paper support 34 and stripping layer 35 are pulled away as indicated in the figure. For transfer of the bromide emulsions plain water is used as a soaking bath. Our invention includes the alternative procedure of providing the bromide emulsions already coated upon a dimensionally stable suport. The operation of transferring them to stable supports is then omitted.

Not only does transfer of the pigmented gelatins to stable supports shortly before use permit the use of mechanical registration, but their transfer to any support, whether stable or not, avoids the veiling over of the high lights which is often a characteristic defect of the carbro process as ordinarily carried out. We have found that the difficulty in obtaining completely clear high lights is caused by the fact that a skin of hard gelatin gradually forms upon the exposed surface of the soft pigmented layer. When a latent image is produced in this same surface, as in the ordinary carbro process, the hard skin becomes essentially a part of that image. When such an image is transferred to another support for development, and the remaining soft portion of the gelatin is dissolved away, even the lightest parts of the developed image will contain a certain minimum thickness of pigmented gelatin, corresponding to the depth to which the surface hardening had progressed before the paper was used.

This effect is avoided in our new process by use of the special pigmented gelatin stripping tissue described above, which permits the transfer of the gelatin layer to another support before it is sensitized and contacted with the bromide. This transfer turns the gelatin layer over, exposing the surface which was previously protected by the intermediate layer, and which is therefore still uniformly soft. When a latent image is formed in this freshly exposed surface, as in the third step of our process, the extreme high light areas of the image may be entirely free of hardened gelatin. During development these areas will therefore wash out completely, leaving clear unveiled high lights in the developed images. The original hardened skin is on the opposite side of the gelatin layer from the image, and is everywhere separated from the image by still soft gelatin (since the gelatin layer is always thicker than the thickest parts of the image). When the soft gelatin is dissolved away during development the hardened skin adheres to the contacting support, and is thus completely removed, leaving the uncontaminated image upon the assembly support. Such a disposal of the original surface layer of the pigmented gelatin cannot be obtained in the ordinary carbro process, nor by any carbro process using ordinary carbon tissue.

In the second step of our process as outlined above the unexposed bromide emulsions supported on plastics bearing registration means are exposed photographically in register, either by contact or by projection, to the color separation negatives from which a color print is to be made. Except for attention to registration, the exposure and subsequent photographic processing of the bromides are carried out normally. If the bromide prints are made by contact, the negatives and the bromide supports can be provided with apertures identical in size and arrangement, as shown in Fig. 1. The printing frame can have corresponding pins, arranged as indicated in Fig. 2, which will fit both the negative and the bromide support, holding them in a definite relative position. If exposure is made by projection, the bromides and the negatives can be held in definite relative position in the enlarger in much the same way as in the printing frame, except that separate pins must be provided to hold the bromides and the negatives, and that the registration apertures in the negatives (and their corresponding pins) need not match the apertures in the bromide supports (and their corresponding pins).

Registration apertures, identically located on the various negatives with respect to the images, can be provided after the negatives are completed by superposing them in accurate registration and punching them all at once. Or the negative stock can be punched before it is exposed, and means provided to hold each negative in the correct position relative to the image in the focal plane of the camera, or relative to the full color transparency to which the negatives are exposed.

The third step of our process, sensitizing the pigmented gelatin layers and contacting them to the bromides, follows the usual carbro procedure, except that both pigment and bromide emulsions are supported on dimensionally stable supports instead of paper backs and that their fresh surfaces are brought together in registration. Fig. 7 shows the contacting operation. As each gelatin layer 32, supported on its grained plastic 33, provided with registration pins (27) as in Fig. 2*a*, makes contact with the corresponding bromide emulsion 36, supported on its grained plastic 37, provided with registration apertures (22) as in Fig. 1*a*, the relative position of the two support plastics is established mechanically. Hence all the latent gelatin images of a set will be formed in identical, accurately determined positions with respect to the registration pins on their respective contacting supports. After the chemical reaction has taken place, the two plastics of each pair are separated, leaving the latent images of hardened gelatin 38, located as indicated in Fig. 8 in the now exposed surfaces of the pigmented gelatins 32, still supported upon the contacting plastics 33.

The fourth step of our new process accomplishes transfer of the first pigment image of the set to the assembly support, and its development thereon. This is the image which will normally form the surface layer of the completed print. The image, still wet and carried on its contacting support as in Fig. 8, is rolled into contact as indicated in Fig. 9 with the wet surface of the assembly support 39, which is equipped with suitable registration means, indicated in the figure by the aperture 22. As the two supports are brought together their relative position is accurately determined mechanically by the registration means. After standing for a few minutes, the two supports with the pigmented gelatin layer between them are placed in water sufficiently hot to melt the soft portions of the gelatin, which are predominantly in contact with the contacting support 33. This is now pulled away, and the remaining soft gelatin dissolved in hot water, leaving the developed image 38 on the surface of the assembly support 39, as shown in Fig. 10, in an accurately determined position relative to its registration apertures 22. After rinsing in cold water, this image is dried in the usual way.

The fifth step of our process, illustrated in Fig. 11, involves the same sequence of operations as the fourth, but carried out with the second color image 38*a*. This latent image, although not clearly visible in its undeveloped state, is accurately located on its contacting support 33*a* with respect to the registration elements of that support. This is rolled into contact with the rewet assembly support 39, which already carries the developed first image 38, and is developed in hot water just as was done with the first image. This leaves the second image 38*a* superposed upon the first one 38 as shown in Fig. 12, and since, due to the action of the mechanical registration, both images have been placed upon the assembly support 39 in the same relation to the registration apertures, they are necessarily in registration with each other. After development of the second image is completed the two combined images are dried.

The sixth step carries the third image through the same operations performed during the fourth and fifth steps, leaving the third pigment image superposed in correct registration upon the first two. The three combined images upon the assembly support are then dried. If the original set of color separation negatives consisted of three negatives, the color print is now completely assembled. If either more or fewer than three negatives were used, the necessary changes in the procedure described will be obvious.

The seventh step in our process, the transfer of the combined image to the final support, is illustrated schematically in Fig. 13. It differs only in detail from the corresponding step in ordinary carbro. The final support can be of the usual type, consisting of a paper support 40 and surface layer of soft gelatin 41. The final support and the complete image on the assembly support 39 are thoroughly wet and then pressed into intimate contact as indicated in Fig. 13. This entire assembly is then dried, pulling the image away from the assembly support and leaving the completed print on the final support (Fig. 14).

Under certain circumstances it is possible with our carbro process to omit the seventh step entirely, using the assembly support also as a final support. When this is to be done the assembly support should be coated with a suitable substratum to insure permanent adhesion of the combined images. If the finished picture is to be viewed as a transparency a transparent assembly support can be used in this way as final support. Or, if white opaque plastic is used for the assembly support, this can serve also as final support for a picture which is to be viewed normally by reflected light. It will be clear in this case that the first color image to be transferred to the assembly support and developed will form the bottom layer of the finished picture rather than the surface layer as in the first described form of our process. Many other variations in our process will be apparent to those skilled in the art, and these are to be considered as much a part of our invention as the particular procedures described here.

In particular, it will be understood that the procedures of our invention can be used in making prints by the carbon process, as well as by the carbro process, the production of a latent image in an outer face of a gelatin film being possible by either method. In the appended claims, it is intended that both carbon and carbro methods of producing the latent image should be included, except as specified to the contrary.

The following are included among the advantages of our method, which combine to reduce the expense of making carbro color prints and to improve their quality. Since the several component images are supported throughout the process on dimensionally stable mounts equipped with registration means, the assembly of the images can be carried out mechanically. This means an appreciable saving of time and avoids the need of specially skilled and trained operators. For the same reason our method is well adapted to the production of color prints or transparencies by continuous process automatic machines. The dimensional stability of our supports is of a higher order than would result from coating the emulsions directly on ordinary film base, and at the same time our method retains the advantage that the materials used are coated on relatively inexpensive paper backing.

The difficult problem of avoiding veiling of the high lights is solved in our method by transferring the pigmented gelatin to a new support before contacting it to the bromide, thus exposing a fresh unhardened surface. No such transfer is possible with ordinary pigmented gelatin tissues.

By using a stripping layer of the type described above, this transfer of the gelatin can be carried out conveniently and without danger of contaminating the gelatin layer.

The assembly of the component color images on a water impermeable assembly support, which is feasible in carbro only with our method of assembly, avoids the use of a new assembly support for each picture. In addition it reduces the time required for assembly (quite apart from registration) because the repeated drying of the image after each component is added is a faster process on our water impermeable support than on the usual paper assembly support.

We claim:

In a carbro process for producing from a film of soft pigmented gelatin a pictorial image composed of relatively insoluble pigmented gelatin, the method of obtaining clear highlights in such an image comprising the steps of providing an assembly having a film of unsensitized soft pigmented gelatin coated on one side of a stripping support which forms a strippable bond for the gelatin, the inner face of said film being protected from contact with the atmosphere by the stripping support and the outer opposite face being exposed to the atmosphere, soaking the assembly and while it is wetted, contacting the same directly to a water insoluble support but with the said outer opposite face of said gelatin film in direct contact with the said last support and removing the said first protective stripping support from the said inner face of the film to uncover the previously protected face of the film in condition free of contamination by relatively insoluble gelatin, sensitizing the gelatin film in a sensitizing solution of carbro type, then contacting the uncontaminated face of the sensitized gelatin film with a positive bromide print to produce in the previously protected face of the gelatin film a carbro latent image in the form of relatively insoluble portions of gelatin, then transferring the film to a third support and developing the latent image in the transferred film by dissolving away the relatively soluble portions of the gelatin.

RICHARD F. McGRAW.
LAWRENCE PLOTIN.
WERNER G. ALEXEWICZ.

REFERENCES CITED

The following references are of record in the file of this patent:

UNITED STATES PATENTS

| Number | Name | Date |
|---|---|---|
| 778,947 | Brasseur | Jan. 3, 1905 |
| 1,240,344 | Ives | Sept. 18, 1917 |
| 1,342,590 | Lovejoy | June 8, 1920 |
| 1,915,873 | Spencer | June 27, 1933 |
| 1,972,311 | Nicoll | Sept. 4, 1934 |
| 1,992,965 | Rowell | Mar. 5, 1935 |
| 2,010,188 | Hagedorn et al. | Aug. 6, 1935 |
| 2,050,552 | Baker | Aug. 11, 1936 |
| 2,140,648 | Nadeau | Dec. 20, 1938 |
| 2,381,234 | Symmes | Aug. 7, 1945 |
| 2,385,599 | Ball et al. | Sept. 25, 1945 |
| 2,422,387 | Ball | June 17, 1947 |

OTHER REFERENCES

Il Progresso Fotografico, 37, Nov. 30, 1930, pages 361–364.

Monthly Abstract Bulletin, issued by the Kodak Research Laboratories, Vol. XVII, No. 2, February 1931, page 87. (Abstract of article by G. Colleoni in Il Prog. Fot., 37:361, Nov. 30, 1930.)